United States Patent
Yoda

(10) Patent No.: US 11,423,649 B2
(45) Date of Patent: Aug. 23, 2022

(54) INFORMATION PROCESSING APPARATUS AND NON-TRANSITORY COMPUTER READABLE MEDIUM FOR DISPLAYING OBJECTS IN VIRTUAL SPACE

(71) Applicant: FUJIFILM BUSINESS INNOVATION CORP., Tokyo (JP)

(72) Inventor: Akira Yoda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 179 days.

(21) Appl. No.: 16/841,736

(22) Filed: Apr. 7, 2020

(65) Prior Publication Data
US 2021/0166029 A1 Jun. 3, 2021

(30) Foreign Application Priority Data
Dec. 2, 2019 (JP) .............................. JP2019-218271

(51) Int. Cl.
| | | |
|---|---|---|
| G06K 15/00 | (2006.01) | |
| G06V 20/20 | (2022.01) | |
| G01C 21/00 | (2006.01) | |
| G06T 11/00 | (2006.01) | |

(52) U.S. Cl.
CPC .............. *G06V 20/20* (2022.01); *G01C 21/00* (2013.01); *G06K 15/007* (2013.01); *G06T 11/00* (2013.01)

(58) Field of Classification Search
None
See application file for complete search history.

(56) References Cited

U.S. PATENT DOCUMENTS

| | | | | |
|---|---|---|---|---|
| 8,139,500 | B2* | 3/2012 | Suzuki | H04L 12/66 370/254 |
| 8,854,669 | B1* | 10/2014 | Jazayeri | G06F 3/1204 358/1.15 |
| 9,888,132 | B2* | 2/2018 | Shibao | H04N 1/00106 |
| 10,282,865 | B2 | 5/2019 | Coglitore | |
| 2004/0050941 | A1* | 3/2004 | Hanyu | G09F 3/10 235/487 |
| 2011/0216355 | A1* | 9/2011 | Takei | G06F 15/00 358/1.15 |
| 2013/0194626 | A1* | 8/2013 | Sakurai | G06F 3/1259 358/1.15 |
| 2014/0055813 | A1* | 2/2014 | Kim | G06F 3/1206 358/1.15 |
| 2015/0070725 | A1* | 3/2015 | Monden | G06F 3/1232 358/1.15 |
| 2019/0272132 | A1* | 9/2019 | Tokuchi | G06F 3/1287 |
| 2020/0404109 | A1* | 12/2020 | Takayama | H04L 67/12 |

FOREIGN PATENT DOCUMENTS

JP  2019-516180 A  6/2019

* cited by examiner

*Primary Examiner* — Dung D Tran
(74) *Attorney, Agent, or Firm* — Oliff PLC

(57) ABSTRACT

An information processing apparatus includes a processor configured to cause thing objects respectively corresponding to things in a real world to be displayed in a virtual space. Each thing object for a corresponding one of the things is displayed in a location closer to a person related to the things than in a location of a different one of the things if a degree of matching between a condition required for the thing by the person related to the things and an attribute of the thing is higher than a degree of matching of the different thing.

20 Claims, 19 Drawing Sheets

| MODEL NAME | FG1 | FG2 | FG3 | FG4 |
|---|---|---|---|---|
| PRINT SPEED (ppm) | 30 | 40 | 50 | 50 |
| THE NUMBER OF RESERVED PRINT JOBS | 2 | 1 | 1 | 0 |
| COLOR PRINTING CAPABILITY | INCAPABLE | CAPABLE | CAPABLE | CAPABLE |

| PRINT SPEED (ppm) | HIGHER THAN 50 ppm |
|---|---|
| THE NUMBER OF RESERVED PRINT JOBS | 0 |
| COLOR PRINTING REQUIREMENT | REQUIRED |

| MODEL NAME | FG1 | FG2 | FG3 | FG4 |
|---|---|---|---|---|
| DEGREE OF MATCHING (THE NUMBER OF MATCHING CONDITIONS) | 0 | 1 | 2 | 3 |

| PRINT SPEED (ppm) | HIGHER THAN 50 ppm |
| --- | --- |
| THE NUMBER OF RESERVED PRINT JOBS | 1 OR SMALLER |
| COLOR PRINTING REQUIREMENT | REQUIRED |

| MODEL NAME | FG1 | FG2 | FG3 | FG4 |
| --- | --- | --- | --- | --- |
| DEGREE OF MATCHING (THE NUMBER OF MATCHING CONDITIONS) | 0 | 1 | 3 | 3 |

| MODEL NAME | FG1 | FG2 | FG3 | FG4 |
|---|---|---|---|---|
| PRINT SPEED (ppm) | 30 | 40 | 50 | 50 |
| THE NUMBER OF RESERVED PRINT JOBS | 2 | 1 | 1 | 0 |
| COLOR PRINTING CAPABILITY | INCAPABLE | INCAPABLE | CAPABLE | CAPABLE |

| MODEL NAME | FG1 | FG2 | FG3 | FG4 |
|---|---|---|---|---|
| DEGREE OF MATCHING (THE NUMBER OF MATCHING CONDITIONS) | 0 | 0 | 2 | 3 |

| MODEL NAME | NP1 | NP2 | NP3 | NP4 | NP5 | NP6 |
|---|---|---|---|---|---|---|
| CPU PERFORMANCE | 2 | 3 | 3 | 2 | 3 | 2 |
| DISPLAY SIZE | 1 | 1 | 3 | 1 | 3 | 2 |
| BODY WEIGHT | 2 | 3 | 2 | 1 | 2 | 1 |
| MEMORY SPACE | 3 | 2 | 3 | 1 | 1 | 1 |
| PRICE | 2 | 3 | 3 | 2 | 3 | 3 |
| DELIVERY TIME | 1 | 1 | 3 | 2 | 3 | 2 |

| CPU PERFORMANCE | 3 |
|---|---|
| DISPLAY SIZE | 2 |
| BODY WEIGHT | 1 |
| MEMORY SPACE | 2 |
| PRICE | 3 |
| DELIVERY TIME | 3 |

| MODEL NAME | NP1 | NP2 | NP3 | NP4 | NP5 | NP6 |
|---|---|---|---|---|---|---|
| DEGREE OF MATCHING (THE NUMBER OF MATCHING CONDITIONS) | 2 | 4 | 6 | 1 | 5 | 3 |

FIG. 26

| PRIORITY IN CONDITION INFORMATION JJ | MODEL NAME | NP3 | NP5 | NP6 | NP1 | NP2 | NP4 |
|---|---|---|---|---|---|---|---|
| 1 | DISPLAY SIZE | 3 | 3 | 2 | 1 | 1 | 1 |

| PRIORITY IN CONDITION INFORMATION JJ | MODEL NAME | NP3 | NP5 | NP6 | NP2 | NP4 | NP1 |
|---|---|---|---|---|---|---|---|
| 1 | PRICE | 3 | 3 | 3 | 3 | 2 | 2 |
| 2 | DELIVERY TIME | 3 | 3 | 2 | 1 | 2 | 1 |

ZJ

INFORMATION PROCESSING APPARATUS AND NON-TRANSITORY COMPUTER READABLE MEDIUM FOR DISPLAYING OBJECTS IN VIRTUAL SPACE

CROSS-REFERENCE TO RELATED APPLICATIONS

This application is based on and claims priority under 35 USC 119 from Japanese Patent Application No. 2019-218271 filed Dec. 2, 2019.

BACKGROUND

(i) Technical Field

The present disclosure relates to an information processing apparatus and a non-transitory computer readable medium.

(ii) Related Art

Japanese Unexamined Patent Application Publication (Translation of PCT Application) No. 2019-516180 discloses a method for presenting an image in a virtualized environment. The method includes generating a virtualized environment for a user by a virtual reality device, detecting a thing in the real world, and rendering an image corresponding to the detected thing in the virtualized environment.

SUMMARY

In the method described above in Japanese Unexamined Patent Application Publication (Translation of PCT Application) No. 2019-516180, a thing object corresponding to a thing that is closer to a user in the real world than the other things are is displayed to the user more conspicuously in the virtual space. However, the thing corresponding to the thing object displayed to the user more conspicuously is not necessarily useful for the user in the real world.

Aspects of non-limiting embodiments of the present disclosure relate to an information processing apparatus that displays, in the virtual space to a user more conspicuously, a thing object corresponding to a thing more useful for the user in the real world than the other things and also relate to a non-transitory computer readable medium for the same.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to cause thing objects respectively corresponding to things in a real world to be displayed in a virtual space. Each thing object for a corresponding one of the things is displayed in a location closer to a person related to the things than in a location of a different one of the things if a degree of matching between a condition required for the thing by the person related to the things and an attribute of the thing is higher than a degree of matching of the different thing.

BRIEF DESCRIPTION OF THE DRAWINGS

Exemplary embodiments of the present disclosure will be described in detail based on the following figures, wherein:

FIG. 4 illustrates the attribute information of Exemplary Embodiment 1;

FIG. 5 illustrates the condition information of Exemplary Embodiment 1;

FIG. 6 illustrates the degree of matching of Exemplary Embodiment 1;

FIG. 9 illustrates the condition information of Exemplary Embodiment 2;

FIG. 10 illustrates the degree of matching of Exemplary Embodiment 2;

FIG. 20 illustrates the attribute information of Exemplary Embodiment 5;

FIG. 21 illustrates the condition information of Exemplary Embodiment 5;

FIG. 22 illustrates the degree of matching of Exemplary Embodiment 5;

FIG. 26 illustrates the attribute information in Modification 2 of Exemplary Embodiment 5;

FIG. 28 illustrates different attribute information in Modification 2 of Exemplary Embodiment 5.

DETAILED DESCRIPTION

Exemplary Embodiment 1

Hereinafter, Exemplary Embodiment 1 of an information processing apparatus according to the present disclosure will be described.

Configuration of Exemplary Embodiment 1

Figure 1:
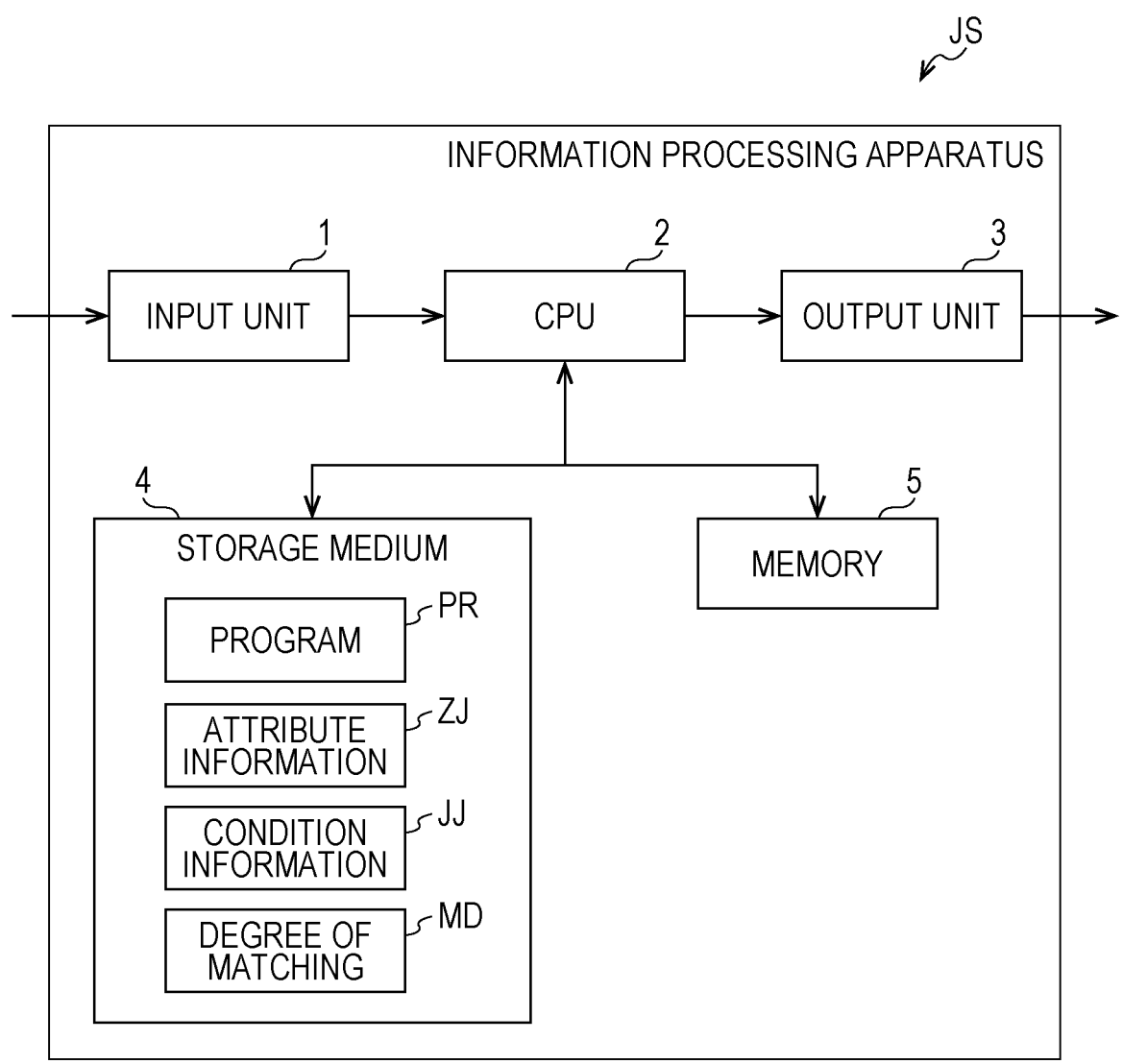
FIG. 1 illustrates the configuration of an information processing apparatus of Exemplary Embodiment 1.
Figure 2:
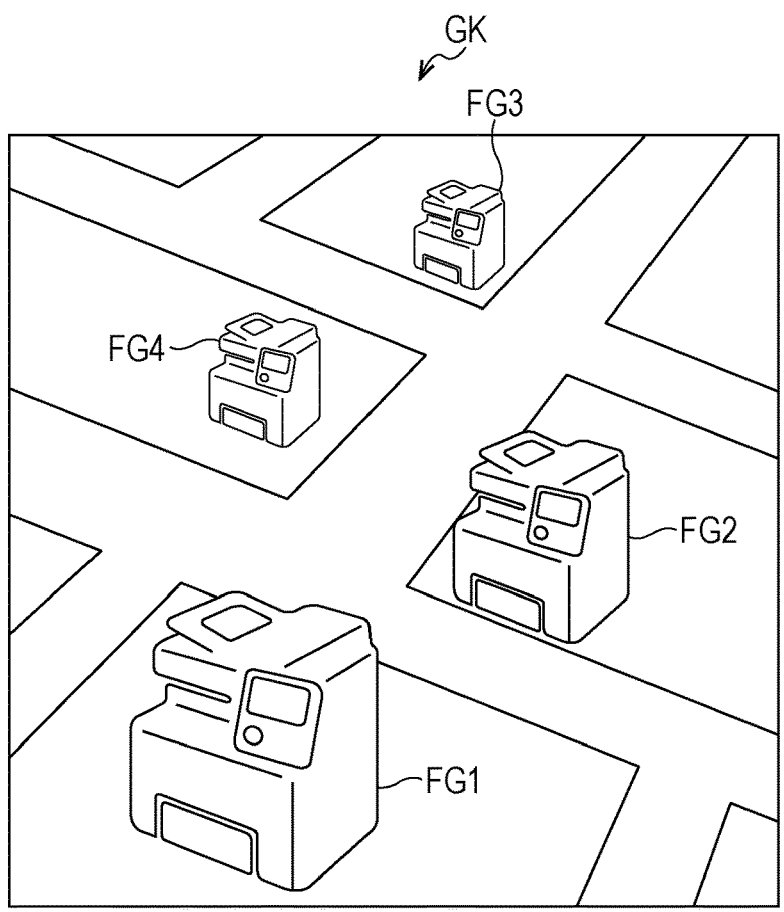
FIG. 2 illustrates a real world in Exemplary Embodiment 1.
Figure 3:
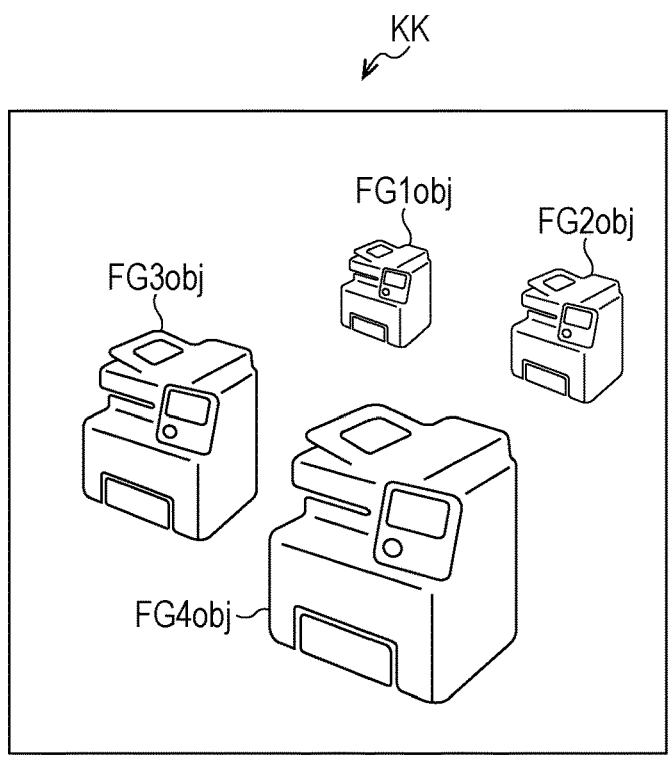
FIG. 3 illustrates a virtual space in Exemplary Embodiment 1.

FIG. 1 illustrates the configuration of an information processing apparatus JS of Exemplary Embodiment 1. FIG. 2 illustrates a real world GK in Exemplary Embodiment 1. FIG. 3 illustrates a virtual space KK in Exemplary Embodiment 1.

The information processing apparatus JS of an exemplary embodiment is an example of a so-called virtual reality (VR) device (for example, a head mounted display). The information processing apparatus JS generates thing objects, that is, for example, multifunctional printer (MFP) objects FG1obj to FG4obj that are each an example of an image processing apparatus object in the virtual space KK (illustrated in FIG. 3), the MFP objects FG1obj to FG4obj corresponding to MFPs FG1 to FG4 (illustrated in FIG. 2) that are each a thing in the real world GK and an example of an image processing apparatus. As illustrated in FIG. 1, to generate the virtual space KK, the information processing apparatus JS includes an input unit 1, a central processing unit (CPU) 2, an output unit 3, a storage medium 4, and a memory 5.

Note that the thing object includes an image that is a thing in the real world and a two-dimensional or three-dimensional image (including a moving image) represented in the virtual space. Examples thereof include an image of an image processing apparatus (referred to as an image processing apparatus object).

The input unit 1 includes, for example, an image sensor, a touch panel, a keyboard, and a network unit. The CPU 2 is an example of a processor and is the well-known nucleus of a computer that causes the hardware thereof to operate in accordance with software. The output unit 3 includes, for example, a liquid crystal monitor, a touch panel, and a network unit. The storage medium 4 includes, for example, a hard disk drive (HDD), a solid state drive (SSD), and a read only memory (ROM). The memory 5 includes, for example, a dynamic random access memory (DRAM) and a static random access memory (SRAM).

As illustrated in FIG. 1, the storage medium 4 stores a program PR, attribute information ZJ, condition information JJ, and a degree of matching MD.

The program PR corresponds to language bundles in which the content of processing to be performed by the information processing apparatus JS is specified.

FIG. 4 illustrates the attribute information ZJ of Exemplary Embodiment 1. The attribute information ZJ represents attributes such as the specifications and operations of the MFPs FG1 to FG4 in the real world GK (illustrated in FIG. 2). Specifically, as illustrated in FIG. 4, the attribute information ZJ includes a model name, a print speed, the number of reserved print jobs, and a color printing capability. In a detailed description, regarding the model name "MFP FG1", the attribute information ZJ stores the print speed "30 ppm", the number of reserved print jobs "2", and the color printing capability "incapable". The number of reserved print jobs is an example of the number of reserved printing processes and is the number of jobs received as printing reservation by a MFP.

Likewise, as illustrated in FIG. 4, the attribute information ZJ represents the print speed "40 ppm", the number of reserved print jobs "1", and the color printing capability "capable" regarding the model name "MFP FG2", the print speed "50 ppm", the number of reserved print jobs "1", and the color printing capability "capable" regarding the model name "MFP FG3", and the print speed "50 ppm", the number of reserved print jobs "0", and the color printing capability "capable" regarding the model name "MFP FG4".

FIG. 5 illustrates the condition information JJ of Exemplary Embodiment 1. The condition information JJ represents conditions required for one of the MFPs FG1 to FG4 by a person (not illustrated) related to the MFPs, more specifically, a user wishing to use the MFP. The condition information JJ is input to the information processing apparatus JS by the user. Specifically, as illustrated in FIG. 5, the condition information JJ includes information regarding attributes other than the model name in the attribute information ZJ (illustrated in FIG. 4), that is, includes the attributes that are the print speed, the number of reserved print jobs, and the color printing capability. In a detailed description, the condition information JJ includes, for example, the print speed "50 ppm or higher", the number of reserved print jobs "0", and the color printing requirement "required".

FIG. 6 illustrates the degree of matching of Exemplary Embodiment 1. The degree of matching MD represents the degree of matching between the attribute information ZJ regarding the MFPs FG1 to FG4 (illustrated in FIG. 4) and the condition information JJ from the user (illustrated in FIG. 5). Specifically, as illustrated in FIG. 6, the degree of matching MD includes a model name and the degree of matching. In a detailed description, in the degree of matching MD regarding the model name "MFP FG1", the print speed "30 ppm" in the attribute information ZJ (illustrated in FIG. 4) does not satisfy the print speed "50 ppm" in the condition information JJ (illustrated in FIG. 5), the number of reserved print jobs "2" in the attribute information ZJ (illustrated in FIG. 4) does not satisfy the number of reserved print jobs "0" in the condition information JJ (illustrated in FIG. 5), and the color printing capability "incapable" in the attribute information ZJ (illustrated in FIG. 4) does not satisfy the color printing requirement "required" in the condition information JJ (illustrated in FIG. 5). As the result, as illustrated in FIG. 6, the degree of matching MD represents the degree of matching "0" regarding the model name "MFP FG1".

Likewise, as illustrated in FIG. 6, the degree of matching MD represents the degree of matching "1" regarding the model name "MFP FG2", the degree of matching "2" regarding the model name "MFP FG3", and the degree of matching "3" regarding the model name "MFP FG4".

Operation of Exemplary Embodiment 1

Figure 7:
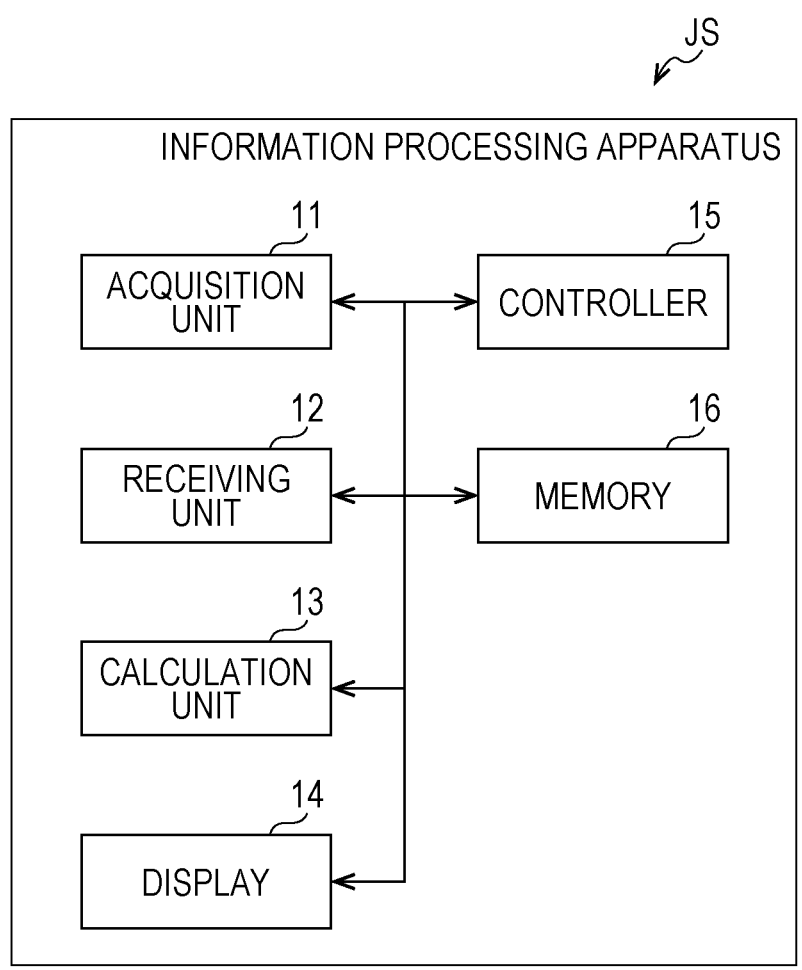
FIG. 7 is a functional block diagram of the information processing apparatus of Exemplary Embodiment 1.

FIG. 7 is a functional block diagram of the information processing apparatus JS of Exemplary Embodiment 1. As illustrated in FIG. 7, the information processing apparatus JS of Exemplary Embodiment 1 includes an acquisition unit 11, a receiving unit 12, a calculation unit 13, a display 14, a controller 15, and a memory 16.

In a relation between the hardware configuration (illustrated in FIG. 1) and the functional configuration (illustrated in FIG. 7) of the information processing apparatus JS, the CPU 2, as hardware, runs the program PR stored in the storage medium 4 (that implements some functions of the memory 16) by using the memory 5 (that implements some other functions of the memory 16) and controls, as the controller 15, the operations of the input unit 1 and the output unit 3 as necessary, and thereby the respective functions of the acquisition unit 11, the receiving unit 12, the calculation unit 13, and the display 14 are implemented. The functions of the units are described later.

Figure 8:
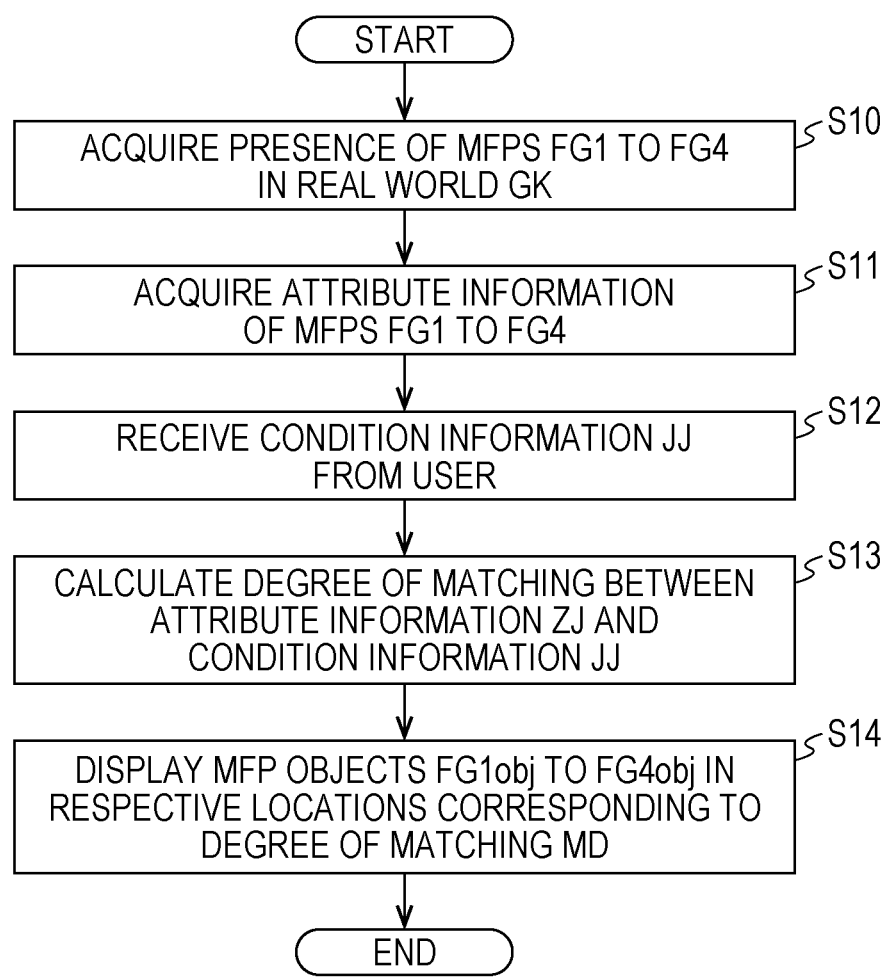
FIG. 8 is a flowchart illustrating the operation of the information processing apparatus of Exemplary Embodiment 1.

FIG. 8 is a flowchart illustrating the operation of the information processing apparatus JS of Exemplary Embodiment 1. Hereinafter, the operation of the information processing apparatus JS will be described with reference to the flowchart in FIG. 8.

Step S10: In the information processing apparatus JS, the CPU 2 (illustrated in FIG. 1) serves as the acquisition unit 11 (illustrated in FIG. 7) and captures an image of the real world GK (illustrated in FIG. 2) and thereby scans the image. The CPU 2 thereby acquires the presence of the MFPs FG1 to FG4 present in the real world GK.

Step S11: After the presence of the MFPs FG1 to FG4 is acquired in step S10, the CPU 2 in the information processing apparatus JS serves as the acquisition unit 11 and acquires the attribute information ZJ regarding the MFPs FG1 to FG4 (illustrated in FIG. 4). The CPU 2 directly acquires the attribute information ZJ by using, for example, the input unit 1 and the output unit 3 (illustrated in FIG. 1) from the MFPs FG1 to FG4 via a network (for example, the Internet). The attribute information ZJ may be acquired from a database (not illustrated) on the network, not from the MFPs FG1 to FG4. The CPU 2 stores the acquired attribute information ZJ in the storage medium 4 (illustrated in FIG. 1).

Step S12: After the attribute information ZJ regarding the MFPs FG1 to FG4 is acquired in step S11, the CPU 2 in the information processing apparatus JS serves as the receiving unit 12 (illustrated in FIG. 7) and receives, from the user intending to use one of the MFPs FG1 to FG4, the condition information JJ (illustrated in FIG. 5) regarding the intended MFP via the input unit 1 (illustrated in FIG. 1). The CPU 2 stores the received condition information JJ in the storage medium 4 (illustrated in FIG. 1).

Note that the condition information regarding the intended MFP may be received from the input panel of the MFP in the real world or an information processing apparatus such as an external terminal apparatus or a personal computer (PC) or may be received in the virtual space.

Step S13: After the condition information JJ regarding the MFP intended to be used by the user is received in step S12, the CPU 2 in the information processing apparatus JS serves as the calculation unit 13 (illustrated in FIG. 2) and calculates the degree of matching MD (illustrated in FIG. 6) between the attribute information ZJ (illustrated in FIG. 4) and the condition information JJ (illustrated in FIG. 5) that are stored in the storage medium 4. The CPU 2 stores the calculated degree of matching MD in the storage medium 4.

Step S14: After the degree of matching MD between the attribute information ZJ and the condition information JJ is calculated in step S13, the CPU 2 in the information processing apparatus JS causes the MFP objects FG1obj to FG4obj corresponding to the MFPs FG1 to FG4 to be displayed in the virtual space KK on the basis of the degree of matching MD, as illustrated in FIG. 3.

In a detailed description, in the degree of matching MD, as illustrated in FIG. 6, the degrees of matching regarding the respective model names "MFP FG1", "MFP FG2", "MFP FG3", and "MFP FG4" are respectively 0, 1, 2, and 3. That is, the degrees of matching of the respective MFPs FG4, FG3, FG2, and FG1 are respectively 3, 2, 1, and 0 in descending order. Accordingly, the CPU 2 causes the MFP FG4, the MFP FG3, the MFP FG2, and the MFP FG1 to be displayed on the output unit 3 (illustrated in FIG. 1) in this order from the location closest to the user to the location most distant from the user.

Exemplary Embodiment 2

Hereinafter, Exemplary Embodiment 2 of the information processing apparatus according to the present disclosure will be described.

Configuration of Exemplary Embodiment 2

The configuration of an information processing apparatus JS of Exemplary Embodiment 2 is the same as the configuration of the information processing apparatus JS of Exemplary Embodiment 1 (illustrated in FIGS. 1 and 7).

The attribute information ZJ of the MFPs FG1 to FG4 of Exemplary Embodiment 2 is the same as the attribute information ZJ of Exemplary Embodiment 1 (illustrated in FIG. 4).

Figures 11, 12:
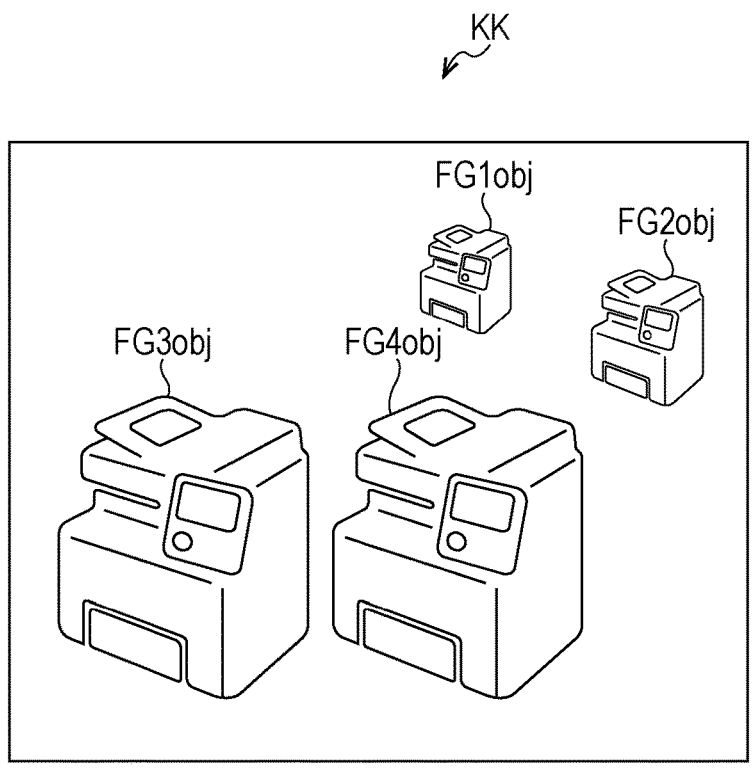
FIG. 11 illustrates a virtual space in Exemplary Embodiment 2.
FIG. 12 illustrates the attribute information of Exemplary Embodiment 3.

FIG. 9 illustrates condition information JJ of Exemplary Embodiment 2. FIG. 10 illustrates a degree of matching MD of Exemplary Embodiment 2. FIG. 11 illustrates a virtual space KK in Exemplary Embodiment 2.

The condition information JJ of Exemplary Embodiment 2 (illustrated in FIG. 9) is partially different from the condition information JJ of Exemplary Embodiment 1 (illustrated in FIG. 5). Due to the difference in the condition information JJ, the degree of matching MD of Exemplary Embodiment 2 (illustrated in FIG. 10) is partially different from the degree of matching MD of Exemplary Embodiment 1 (illustrated in FIG. 6).

As illustrated in FIG. 9, the condition information JJ of Exemplary Embodiment 2 represents, for example, the print speed "50 ppm or higher" and the color printing requirement "required" like Exemplary Embodiment 1 and in contrast represents the number of reserved print jobs "1 or smaller" unlike Exemplary Embodiment 1.

As illustrated in FIG. 10, the degree of matching MD of Exemplary Embodiment 2 represents the degrees of matching 0, 1, and 3 of the respective model names "MFP FG1", "MFP FG2", and "MFP FG4" like Exemplary Embodiment 1. In contrast, the degree of matching MD represents the degree of matching "3" regarding "MFP FG3" unlike Exemplary Embodiment 1.

Operation of Exemplary Embodiment 2

The operation of the information processing apparatus JS of Exemplary Embodiment 2 is the same as the operation of the information processing apparatus JS of Exemplary Embodiment 1. Hereinafter, the operation of the information processing apparatus JS of Exemplary Embodiment 2 will be described with reference to the flowchart in FIG. 8.

Step S13: Like Exemplary Embodiment 1, the presence of the MFPs FG1 to FG4 (illustrated in FIG. 2) is acquired in step S10, the attribute information ZJ regarding the MFPs FG1 to FG4 (illustrated in FIG. 4) is acquired in step S11, and the condition information JJ regarding the MFP intended to be used by the user (illustrated in FIG. 9) is received in step S12. Thereafter, the CPU 2 (illustrated in FIG. 1) in the information processing apparatus JS calculates the degree of matching MD (illustrated in FIG. 10) between the attribute information ZJ (illustrated in FIG. 4) identical to the attribute information ZJ of Exemplary Embodiment 1 and the condition information JJ (illustrated in FIG. 9) partially different from the condition information JJ of Exemplary Embodiment 1 that are stored in the storage medium (illustrated in FIG. 1). The CPU 2 stores the calculated degree of matching MD in the storage medium 4.

Step S14: After the degree of matching MD between the attribute information ZJ and the condition information JJ is calculated in step S13, the CPU 2 in the information processing apparatus JS serves as the display 14 (illustrated in FIG. 7) and causes the MFP objects FG1obj to FG4obj corresponding to the MFPs FG1 to FG4 to be displayed in the virtual space KK on the basis of the degree of matching MD, as illustrated in FIG. 11.

In a detailed description, in the degree of matching MD, as illustrated in FIG. 10, the degrees of matching regarding the respective model names "MFP FG1", "MFP FG2", "MFP FG3", and "MFP FG4" are respectively 0, 1, 3, and 3. That is, the degrees of matching of the respective MFPs FG4, FG3, FG2, and FG1 are respectively 3, 3 that is of the same rank as that of the MFP FG4, 1, and 0 in descending order.

Accordingly, the CPU 2 causes the MFP FG4 and the MFP FG3 having the identical degree of matching to be each displayed in the location that is closest to the user and that is an identical distance distant from the user, the MFP FG2 to be displayed in a location distant from the user, and the MFP FG1 to be displayed in the location most distant from the user.

Exemplary Embodiment 3

Hereinafter, Exemplary Embodiment 3 of the information processing apparatus according to the present disclosure will be described.

Configuration of Exemplary Embodiment 3

The configuration of an information processing apparatus JS of Exemplary Embodiment 3 is the same as the configuration of the information processing apparatus JS of Exemplary Embodiment 1 (illustrated in FIGS. 1 and 7).

Figures 13, 14:
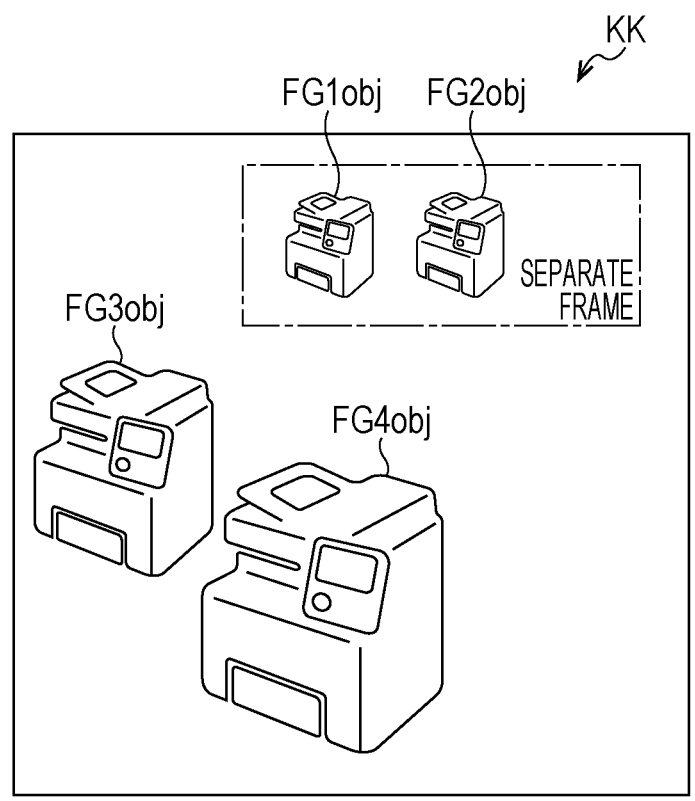
FIG. 13 illustrates the degree-of-matching information of Exemplary Embodiment 3.
FIG. 14 illustrates a virtual space in Exemplary Embodiment 3.

FIG. 12 illustrates attribute information ZJ of Exemplary Embodiment 3. FIG. 13 illustrates a degree of matching MD of Exemplary Embodiment 3. FIG. 14 illustrates a virtual space KK in Exemplary Embodiment 3.

The attribute information ZJ of Exemplary Embodiment 3 (illustrated in FIG. 12) is partially different from the attribute information ZJ of Exemplary Embodiment 1 (illustrated in FIG. 4). Due to the difference in the attribute information ZJ, the degree of matching MD of Exemplary Embodiment 3 (illustrated in FIG. 13) is partially different from the degree of matching MD of Exemplary Embodiment 1 (illustrated in FIG. 6).

As illustrated in FIG. 12, the attribute information ZJ of Exemplary Embodiment 3 represents a print speed, the number of reserved print jobs, and a color printing capability regarding the model names "MFP FG1", "MFP FG3", and "MFP FG4", like Exemplary Embodiment 1.

As illustrated in FIG. 12, the attribute information ZJ of Exemplary Embodiment 3 represents the print speed "40 ppm" and the number of reserved print jobs "1" regarding the model name "MFP FG2" like Exemplary Embodiment 1 and in contrast represents the color printing capability "incapable" unlike Exemplary Embodiment 1.

The condition information JJ of Exemplary Embodiment 3 is the same as the condition information JJ of Exemplary Embodiment 1 (illustrated in FIG. 5).

As illustrated in FIG. 13, according to the attribute information ZJ (illustrated in FIG. 12) partially different from that in Exemplary Embodiment 1 and the condition information JJ (illustrated in FIG. 5) identical to that in Exemplary Embodiment 1, the degree of matching MD of Exemplary Embodiment 3 represents the degrees of matching 0, 0, 2, and 3 regarding the respective model names "MFP FG1", "MFP FG2", "MFP FG3", and "MFP FG4". That is, the degree of matching "0" regarding the MFP FG1 and the MFP FG2 is lower than 1 (corresponding to a predetermined degree) and thus denotes that the MFP FG1 and the MFP FG2 are virtually unusable.

Operation of Exemplary Embodiment 3

The operation of the information processing apparatus JS of Exemplary Embodiment 3 is basically the same as the operation of the information processing apparatus JS of Exemplary Embodiment 1. Hereinafter, the operation of the information processing apparatus JS of Exemplary Embodiment 3 will be described with reference to the flowchart in FIG. 8.

Step S13: Like Exemplary Embodiment 1, the presence of the MFPs FG1 to FG4 (illustrated in FIG. 2) is acquired in step S10, the attribute information ZJ regarding the MFPs FG1 to FG4 (illustrated in FIG. 12) is acquired in step S11, and the condition information JJ regarding the MFP intended to be used by the user (illustrated in FIG. 5) is received in step S12. Thereafter, the CPU 2 (illustrated in FIG. 1) in the information processing apparatus JS serves as the calculation unit 13 (illustrated in FIG. 7) and calculates the degree of matching MD (illustrated in FIG. 13) between the attribute information ZJ (illustrated in FIG. 12) partially different from that in Exemplary Embodiment 1 and the condition information JJ (illustrated in FIG. 5) identical to that in Exemplary Embodiment 1 that are stored the storage medium 4 (illustrated in FIG. 1). The CPU 2 stores the calculated degree of matching MD in the storage medium 4.

Step S14: After the degree of matching MD between the attribute information ZJ and the condition information JJ is calculated in step S13, the CPU 2 in the information processing apparatus JS serves as the calculation unit 13 and causes the MFP objects FG1obj to FG4obj corresponding to the MFPs FG1 to FG4 to be displayed in the virtual space KK on the basis of the degree of matching MD, as illustrated in FIG. 14.

In a detailed description, as illustrated in FIG. 12, in the degree of matching MD, the degrees of matching regarding the respective model names "MFP FG1", "MFP FG2", "MFP FG3", and "MFP FG4" are respectively 0, 0, 2, and 3. That is, the degrees of matching of the respective MFPs FG4, FG3, FG2, and FG1 are respectively 3, 2, 0, and 0 that is of the same rank as that of the MFP FG2 in descending order.

Accordingly, the CPU 2 causes the MFP FG4 to be displayed in the virtual space KK in the location closest to the user, the MFP FG3 to be displayed in the location second closest to the user, and the MFP FG2 and the MFP FG1 having the degree of matching "0", in other words, that is substantially unusable, to be displayed in a separate frame (outside the body).

Exemplary Embodiment 4

Hereinafter, Exemplary Embodiment 4 of the information processing apparatus according to the present disclosure will be described.

Configuration of Exemplary Embodiment 4

The configuration of an information processing apparatus JS of Exemplary Embodiment 4 is the same as the configuration of the information processing apparatus JS of Exemplary Embodiment 1 (illustrated in FIGS. 1 and 7).

Operation of Exemplary Embodiment 4

Figure 15:
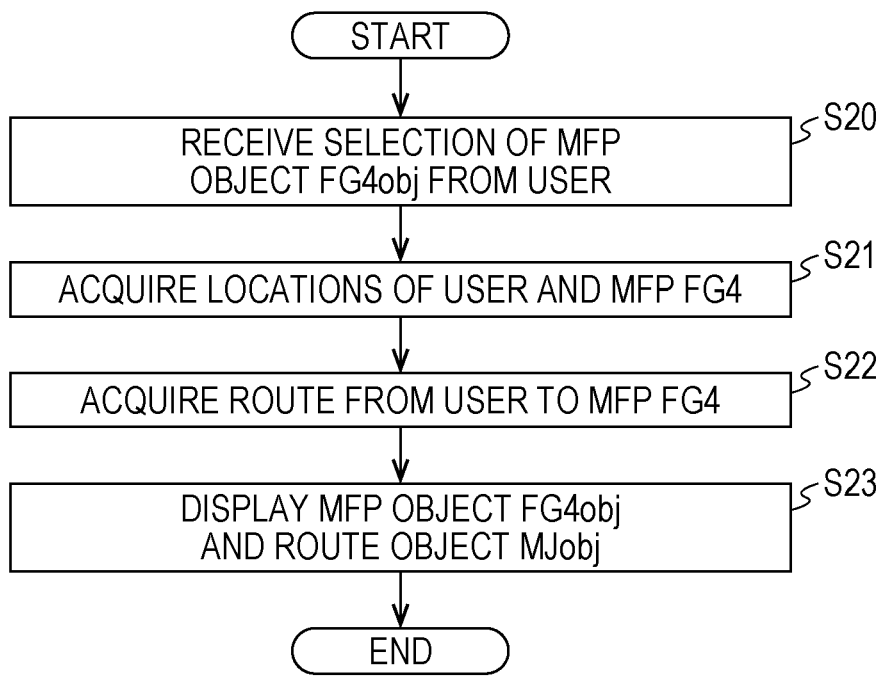
FIG. 15 is a flowchart illustrating the operation of an information processing apparatus of Exemplary Embodiment 4.
Figure 16:
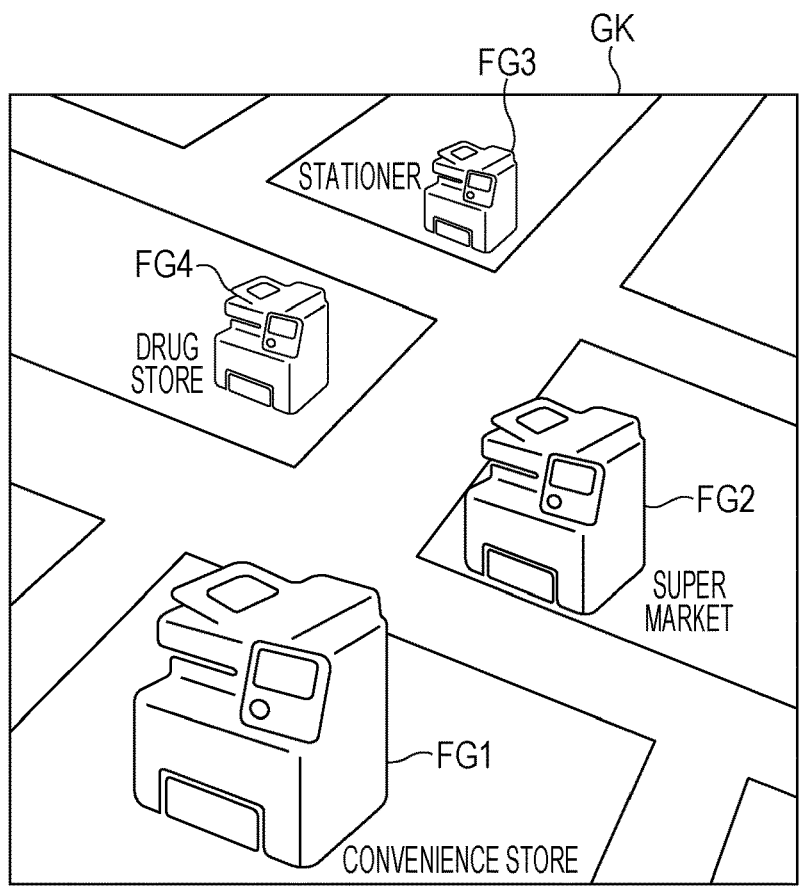
FIG. 16 illustrates a real world in Exemplary Embodiment 4.
Figure 17:
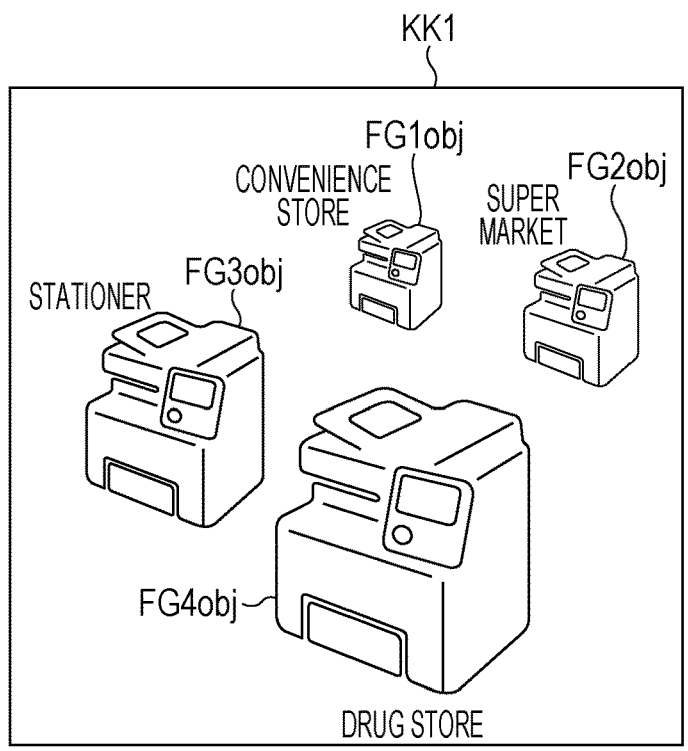
FIG. 17 illustrates a virtual space (layout) in Exemplary Embodiment 4.
Figure 18:
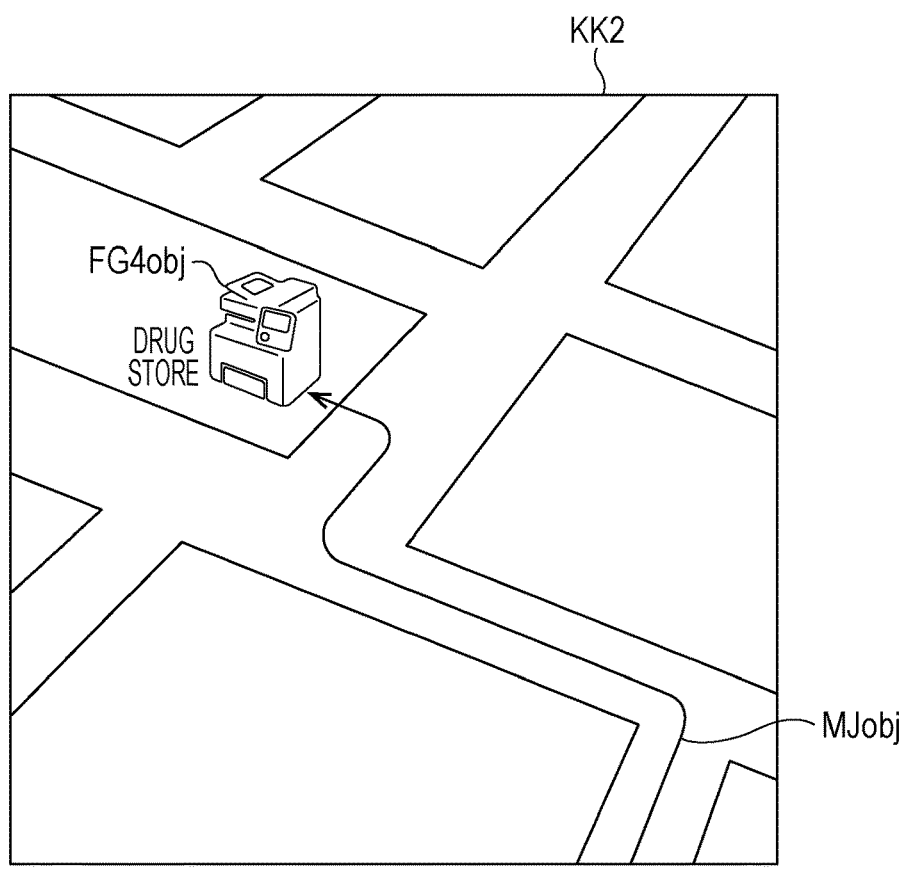
FIG. 18 illustrates a virtual space (route) in Exemplary Embodiment 4.

FIG. 15 is a flowchart illustrating the operation of the information processing apparatus JS of Exemplary Embodiment 4. FIG. 16 illustrates a real world GK in Exemplary Embodiment 4. FIG. 17 illustrates a virtual space KK1 of Exemplary Embodiment 4 (layout). FIG. 18 illustrates a virtual space KK2 of Exemplary Embodiment 4 (route).

Hereinafter, the operation of the information processing apparatus JS of Exemplary Embodiment 4 will be described with reference to FIGS. 15 to 18.

For easy-to-understand explanation, it is assumed that the operations that are the same as those in steps S10 to S14 of Exemplary Embodiment 1 have been performed. Specifically, the presence of the MFPs FG1 to FG4 in a real world GK representing, for example, an urban area (illustrated in FIG. 16) has been acquired in step S10. The attribute information ZJ regarding the MFPs FG1 to FG4 (illustrated in FIG. 4) has been acquired in step S11. The condition information JJ (illustrated in FIG. 5) has been received in step S12. The degree of matching MD (illustrated in FIG. 6) has been calculated in step S13. In step S14, the MFP objects FG1obj to FG4obj have been displayed on the basis of the degree of matching MD in the virtual space KK1 (illustrated in FIG. 17).

Step S20: After steps S10 to S14 described above, the user selects the MFP object FG4obj most useful for the user, that is, displayed in the location closest to the user from among the MFP objects FG1obj to FG4obj displayed on the output unit 3 (illustrated in FIG. 1). The CPU 2 in the information processing apparatus JS serves as the receiving unit 12 (illustrated in FIG. 7) and receives the selection of the MFP object FG4obj.

Step S21: After the selection of the MFP object FG4obj is received in step S20, the CPU 2 in the information processing apparatus JS serves as the acquisition unit 11 (illustrated in FIG. 7) and acquires the location of the user and the location of the MFP FG4 corresponding to the selected MFP object FG4obj. The CPU 2 acquires the location of the user by using, for example, a known global positioning system (GPS) function of the information processing apparatus JS. The CPU 2 acquires the location of the MFP FG4 by using, for example, the GPS function of the MFP FG4.

Step S22: After the location of the user and the location of the MFP FG4 are acquired in step S21, the CPU 2 in the information processing apparatus JS serves as the acquisition unit 11 (illustrated in FIG. 7) and a route (not illustrated) from the location of the user to the MFP FG4. The CPU 2 acquires the route by using, for example, a known navigation function of the information processing apparatus JS.

Step S23: After the route from the user to the MFP FG4 is acquired in step S22, the CPU 2 in the information processing apparatus JS causes only the MFP object FG4obj selected in step S20 to be displayed in the virtual space KK2 (illustrated in FIG. 18), in other words, causes the MFP objects FG1obj to FG3obj not to be displayed. In addition, the CPU 2 causes a route object MJobj corresponding to the route acquired in step S22 to be displayed in the virtual space KK2. As illustrated in FIG. 18, only the MFP object FG4obj and the route object MJobj are thereby displayed in the virtual space KK2.

Exemplary Embodiment 5

Hereinafter, Exemplary Embodiment 5 of the information processing apparatus according to the present disclosure will be described.

Configuration of Exemplary Embodiment 5

The configuration of an information processing apparatus JS of Exemplary Embodiment 5 is the same as the configuration of the information processing apparatus JS of Exemplary Embodiment 1 (illustrated in FIGS. 1 and 7).

Operation of Exemplary Embodiment 5

Figure 19:
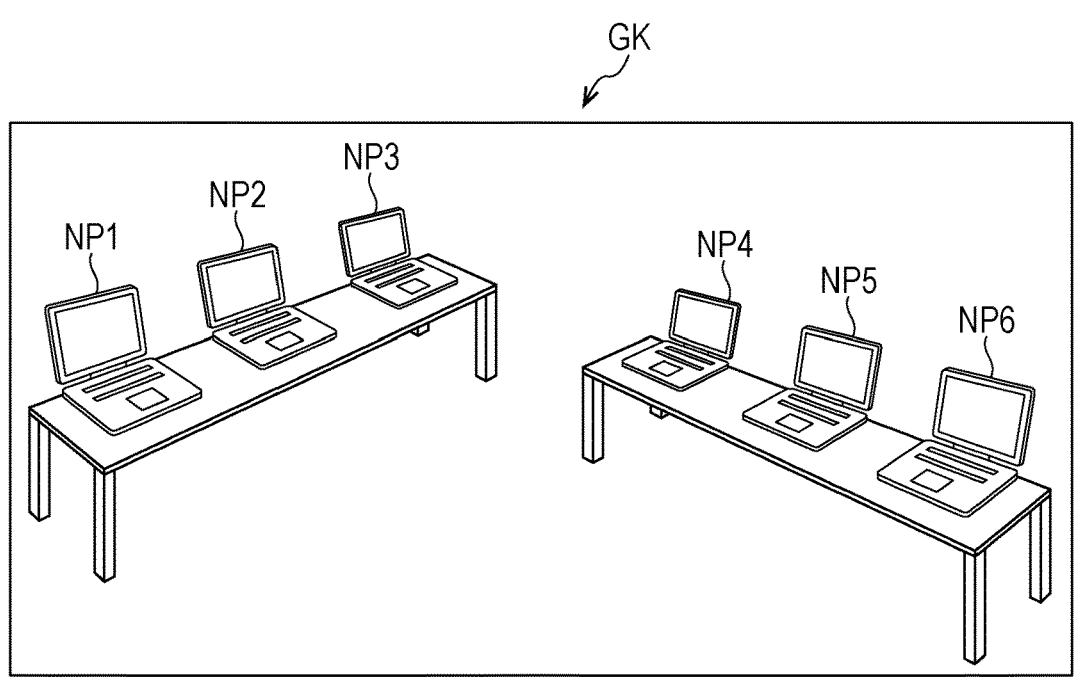
FIG. 19 illustrates a real world in Exemplary Embodiment 5.
Figure 23:
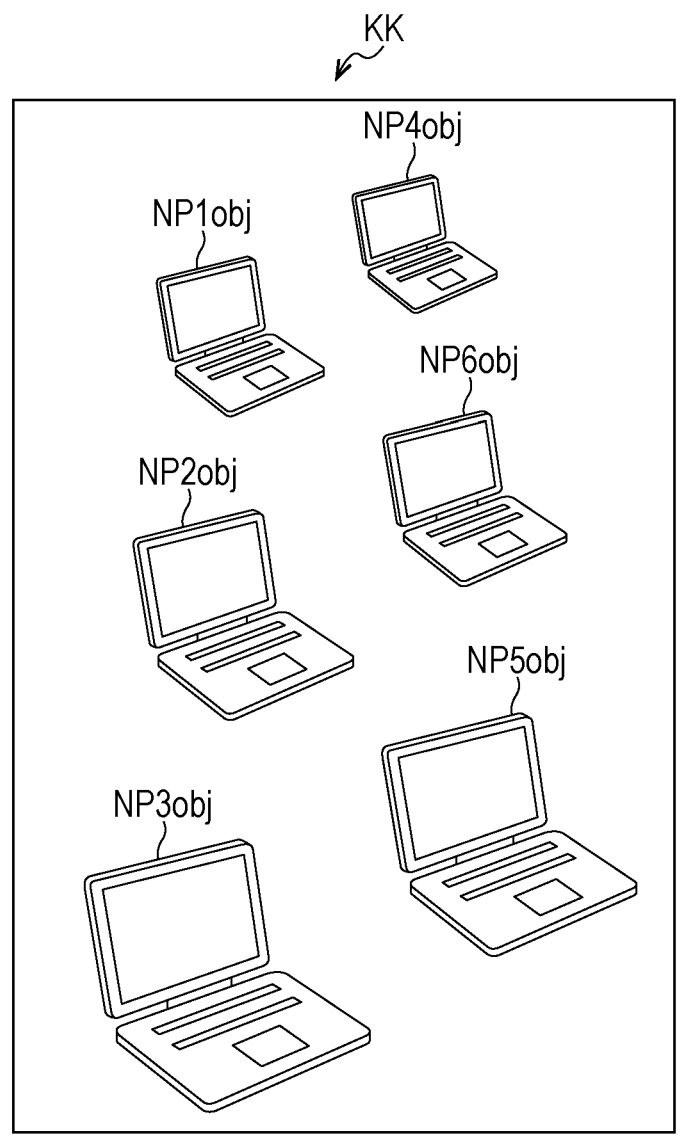
FIG. 23 illustrates a virtual space in Exemplary Embodiment 5.

FIG. 19 illustrates a real world GK in Exemplary Embodiment 5. FIG. 20 illustrates attribute information ZJ of Exemplary Embodiment 5. FIG. 21 illustrates condition information JJ of Exemplary Embodiment 5. FIG. 22 illustrates a degree of matching MD of Exemplary Embodiment 5. FIG. 23 illustrates a virtual space KK in Exemplary Embodiment 5.

The operation of the information processing apparatus JS of Exemplary Embodiment 5 is the same as the operation of the information processing apparatus JS of Exemplary Embodiment 1. Hereinafter, the operation of the information processing apparatus JS of Exemplary Embodiment 5 will be described with reference to the flowchart in FIG. 8 and FIGS. 19 to 23.

To simplify the expression of a term, a notebook personal computer that is an example of a commodity is hereinafter shortened as a notebook PC.

Step S10: The CPU 2 (illustrated in FIG. 1) in the information processing apparatus JS serves as the acquisition unit 11 (illustrated in FIG. 7) and scans an image of, for example, the real world GK (illustrated in FIG. 19) in the mass merchandiser. The CPU 2 thereby acquires the presence of notebook PCs NP1 to NP6 present in the real world GK.

Step S11: After the presence of the notebook PCs NP1 to NP6 is acquired in step S10, the CPU 2 in the information processing apparatus JS serves as the acquisition unit 11 and acquires the attribute information ZJ (illustrated in FIG. 20) of the notebook PCs NP1 to NP6. The CPU 2 stores the acquired attribute information ZJ in the storage medium (illustrated in FIG. 1).

Note that as illustrated in FIG. 20, regarding the notebook PCs NP1 to NP6, the attribute information ZJ includes attributes that are, for example, a CPU performance, a display size, a body weight, a memory space, a price, and delivery time. The CPU performance, the display size, the body weight, and the memory space are each an example of performance of the commodity. The price corresponds to a price of the commodity. The delivery time corresponds to time for delivering the commodity.

As illustrated in FIG. 20, the attribute information ZJ uses 3, 2, and 1 to represent the values of the above-described attributes. For each attribute, 3 denotes "desirable to a high degree" to an intending purchaser, 2 denotes "desirable", and 1 denotes "slightly desirable".

In the attribute information ZJ, for example, regarding the notebook PC NP1, the CPU performance represents 2 denoting "desirable", the display size represents 1 denoting "slightly desirable", the body weight represents 2 denoting "desirable", the memory space represents 3 denoting "desirable to a high degree", the price represents 2 denoting "desirable", and the delivery time represents 1 denoting "slightly desirable".

Step S12: After the attribute information ZJ of the notebook PCs NP1 to NP6 is acquired in step S11, the CPU 2 in the information processing apparatus JS serves as the receiving unit 12 (illustrated in FIG. 7) and receives, from an intending purchaser who intends to purchase a notebook PC, the condition information JJ (illustrated in FIG. 21) regarding the intended notebook PC via the input unit 1 (illustrated in FIG. 1). The CPU 2 stores the received condition information JJ in the storage medium 4 (illustrated in FIG. 1).

Step S13: After the condition information JJ regarding the notebook PC intended to be purchased by the intending purchaser is received in step S12, the CPU 2 in the information processing apparatus JS serves as the calculation unit 13 (illustrated in FIG. 2) and calculates the degree of matching MD (illustrated in FIG. 22) between the attribute information ZJ (illustrated in FIG. 20) and the condition information JJ (illustrated in FIG. 21).

The degree of matching MD is calculated for, for example, the notebook PC NP1 in the following manner.

The CPU performance "2" in the attribute information ZJ does not satisfy the CPU performance "3" in the condition information JJ.

The display size "1" in the attribute information ZJ does not satisfy the display size "2" in the condition information JJ.

The body weight "2" in the attribute information ZJ satisfies the body weight "1" in the condition information JJ.

The memory space "3" in the attribute information ZJ satisfies the memory space "2" in the condition information JJ.

The price "2" in the attribute information ZJ does not satisfy the price "3" in the condition information JJ.

The delivery time "1" in the attribute information ZJ does not satisfy the delivery time "3" in the condition information JJ.

As described above, items that satisfy the condition information JJ from the intending purchaser in the attribute information ZJ of the notebook PC NP1 are two items that are the body weight and the memory space. Accordingly, the degree of matching of the notebook PC NP1 is 2, as illustrated in FIG. 22.

The degree of matching MD is calculated for the other notebook PCs NP2 to NP6 in the same manner as for the above-described notebook PC NP1, and the degrees of matching thereof are respectively 4, 6, 1, 5, and 3.

Step S14: After the degree of matching MD is calculated in step S13, the CPU 2 in the information processing apparatus JS serves as the display 14 (illustrated in FIG. 2) and causes notebook PC objects NP1obj to NP6obj corresponding to the notebook PCs NP1 to NP6 to be displayed in the virtual space KK on the basis of the degree of matching MD, as illustrated in FIG. 23.

In a detailed description, in the degree of matching MD, as illustrated in FIG. 22, the degrees of matching of the respective notebook PCs NP3, NP5, NP2, NP6, NP1, and NP4 are respectively 6, 5, 4, 3, 2, and 1 in descending order. Accordingly, as illustrated in FIG. 23, the CPU 2 causes the output unit 3 (illustrated in FIG. 1) to display the notebook PC objects NP3obj, NP5obj, NP2obj, NP6obj, NP1obj, and NP4obj in this order from the location closest to the user to the location most distant from the user.

Modification 1

Figure 24:
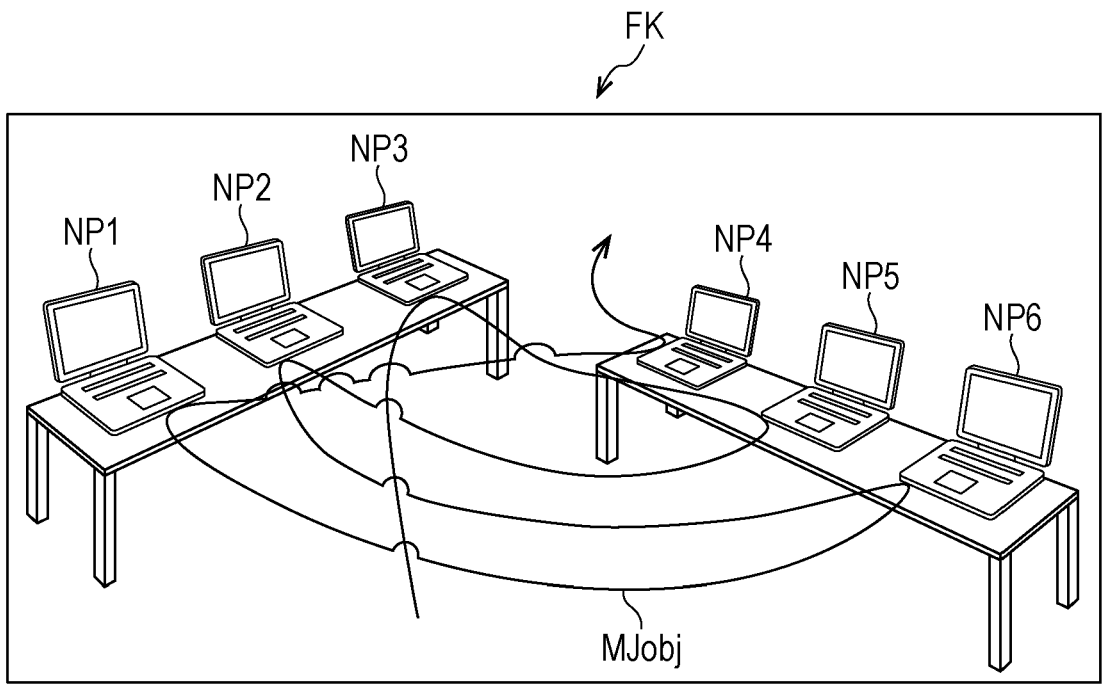
FIG. 24 illustrates a mixed space in Modification 1 of Exemplary Embodiment 5.

FIG. 24 illustrates a mixed space FK in Modification 1 of Exemplary Embodiment 5.

As illustrated in FIG. 24, in Modification 1 of Exemplary Embodiment 5, the CPU 2 (illustrated in FIG. 1) serves as the display 14 (illustrated in FIG. 7) and causes, to be displayed in the virtual space KK, a route object MJobj representing the order in which the intending purchaser looks around the notebook PCs NP1 to NP6 in the real world GK (illustrated in FIG. 19) in descending order of the aforementioned degrees of matching in the degree of matching MD. The CPU 2 also generates the mixed space FK (illustrated in FIG. 24) by superimposing the virtual space KK on the real world GK.

The degrees of matching of the respective notebook PCs NP3, NP5, NP2, NP6, NP1, and NP4 are respectively 6, 5, 4, 3, 2, and 1 in descending order, as described above. Accordingly, the route object MJobj indicates that the intending purchaser who intends to purchase a notebook PC desirably looks around the notebook PC NP3, the notebook PC NP5, the notebook PC NP2, the notebook PC NP6, the notebook PC NP1, and the notebook PC NP4 in this order.

Modification 2

Figure 25:
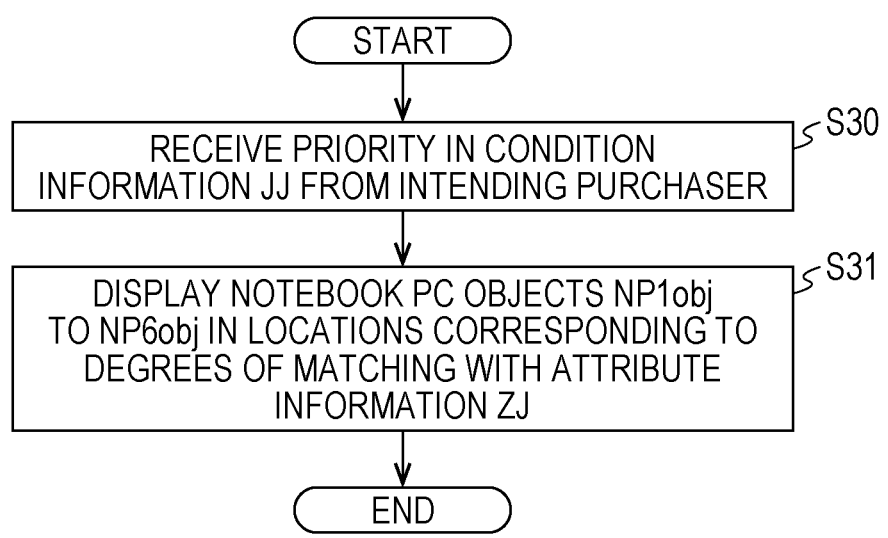
FIG. 25 is a flowchart illustrating the operation of the information processing apparatus in Modification 2 of Exemplary Embodiment 5.
Figure 27:
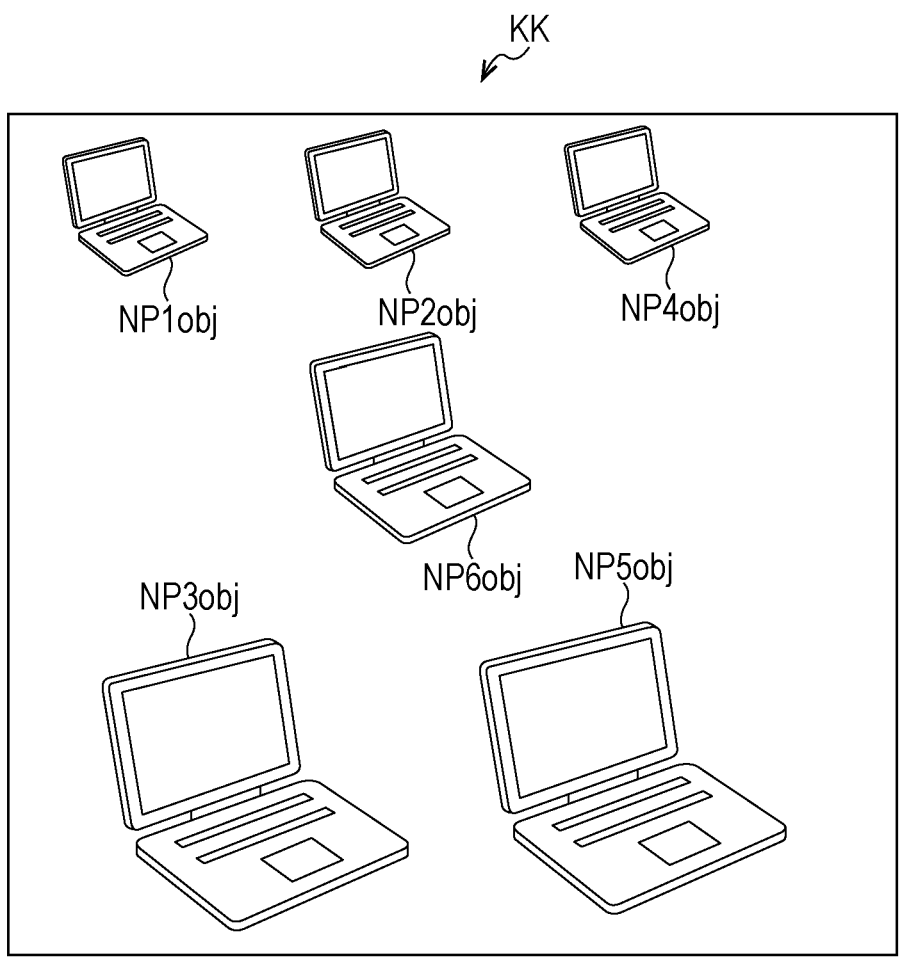
FIG. 27 illustrates a virtual space in Modification 2 of Exemplary Embodiment 5.

FIG. 25 is a flowchart illustrating the operation of the information processing apparatus of Modification 2 of Exemplary Embodiment 5. FIG. 26 illustrates attribute information ZJ in Modification 2 of Exemplary Embodiment 5. FIG. 27 illustrates a virtual space KK in Modification 2 of Exemplary Embodiment 5.

Hereinafter, the operation of the information processing apparatus of Modification 2 of Exemplary Embodiment 5 will be described with reference to the flowchart in FIG. 25.

For easy-to-understand explanation, the following description assumes that steps S11 to S12 of Exemplary Embodiment 5 have been completed and steps S30 and S31 in the flowchart in FIG. 25 are performed instead of steps S13 and S14 of Exemplary Embodiment 5 described above.

Step S30: The CPU 2 (illustrated in FIG. 1) in the information processing apparatus JS serves as the receiving unit 12 (illustrated in FIG. 7) and receives priority in the condition information JJ (illustrated in FIG. 21) regarding an intended notebook PC from the intending purchaser.

The CPU 2 receives, for example, the display size as the highest priority.

Step S31: After the priority in the condition information JJ is received in step S30, the CPU 2 in the information processing apparatus JS serves as the display 14 (illustrated in FIG. 7) and causes the notebook PC objects NP1obj to NP6obj to be displayed in the virtual space KK (illustrated in FIG. 27) on the basis of the degrees of matching between the display size in the condition information JJ and the display size in the attribute information ZJ (illustrated in FIG. 20) of the notebook PCs NP1 to NP6.

In a detailed description, as illustrated in FIG. 26, attribute values of the display size regarding the respective model names "NP3", "NP5", "NP6", "NP1", "NP2", and "NP4" are respectively 3, 3, 2, 1, 1, and 1 in descending order.

Accordingly, as illustrated in FIG. 27, the CPU 2 causes the notebook PC objects NP3obj and NP5obj to be each displayed in the virtual space KK in the location closest to the user. The CPU 2 also causes the notebook PC object NP6obj to be displayed in a location distant from the user.

The CPU 2 further causes the notebook PC objects NP1obj, NP2obj, and NP4obj to be displayed in the location most distant from the user.

Different Example in Modification 2

Figure 29:
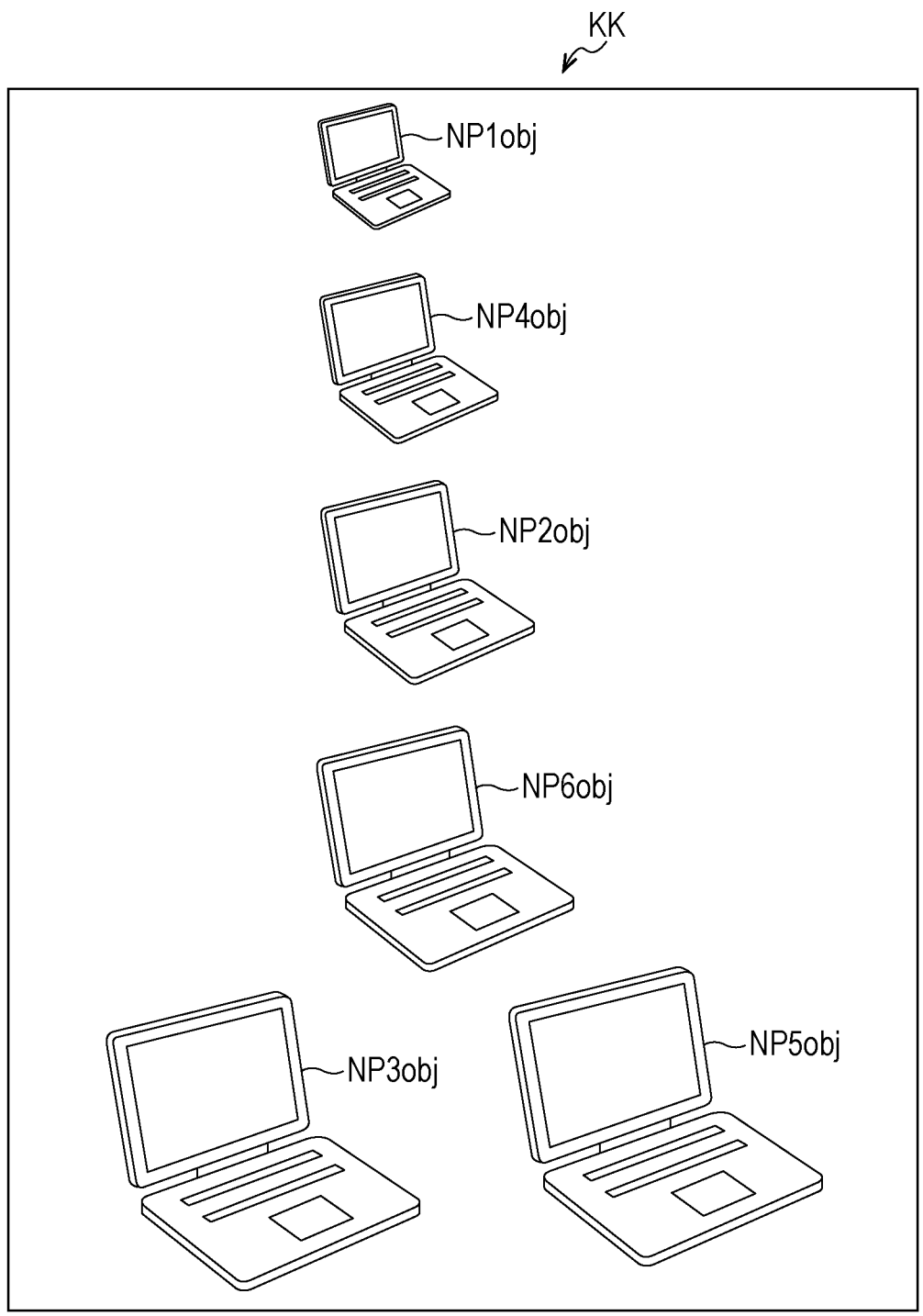
FIG. 29 illustrates a different virtual space in Modification 2 of Exemplary Embodiment 5.

FIG. 28 illustrates different attribute information ZJ in Modification 2 of Exemplary Embodiment 5. FIG. 29 illustrates a different virtual space KK in Modification 2 of Exemplary Embodiment 5.

The different example in Modification 2 assumes that in step S30 described above, the CPU 2 receives, for example, the price as the highest priority and the delivery time as the second highest priority.

In step S31, the CPU 2 causes the notebook PC objects NP1obj to NP6obj to be displayed in the virtual space KK (illustrated in FIG. 29) on the basis of the degrees of matching between the price (a first priority) and the delivery time (a second priority) in the condition information JJ (illustrated in FIG. 21) and the price and the delivery time in the attribute information ZJ (illustrated in FIG. 20) of the notebook PCs NP1 to NP6.

In a detailed description, as illustrated in FIG. 28, the attribute values of the price (first priority) regarding the respective notebook PCs NP3, NP5, NP6, NP2, NP4, and NP1 are respectively 3, 3, 3, 3, 2, and 2 in descending order.

Further, as illustrated in FIG. 28, when the delivery time (second priority) is also considered, the attribute values thereof regarding the notebook PCs NP3, NP5, NP6, NP2, NP4, and NP1 are respectively 3, 3, 2, 1, 2, and 1 in descending order.

Accordingly, as illustrated in FIG. 29, the CPU 2 causes the notebook PC objects NP3obj and NP5obj to be each displayed in the virtual space KK in the location closest to the user. The CPU 2 also causes the notebook PC object NP6obj to be displayed in the location second closest to the user. The CPU 2 also causes the notebook PC object NP2obj to be displayed in a location slightly distant from the user. The CPU 2 causes the notebook PC object NP4obj to be displayed in a location distant from the user. The CPU 2 further causes the notebook PC object NP1obj to be displayed in the location most distant from the user.

Modification 3

One condition may be required for a thing by the user, instead of the multiple conditions. For example, if there is one condition for an MFP to be used by the user that is time to complete printing (printing completion time), thing objects corresponding to MFPs may be displayed in the virtual space in respective locations from the location closest to the user in ascending order of printing completion time. If there is one condition for an intended notebook PC that is inexpensiveness, control may be performed to display a thing object corresponding to an inexpensive notebook PC to be displayed in the virtual space, in a location closer to the user than in a location for a not inexpensive notebook PC.

Modification 4

If the user performs an operation indicating use intention on a thing object in the virtual space (for example, a touch or a gaze), control may be performed to disappear the other thing objects having been displayed. Control to change displaying may also be performed. In the changing of the displaying, changing the color and the size or the like is performed in such a manner that the other thing objects are distinguishable from the thing object on which the user performs the operation indicating the use intention.

Supplementary Description of Processor and Program

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments described above, the program PR may be provided in such a manner as to be recorded in a recording medium such as a compact disc read only memory (CD-ROM), a digital versatile disc read only memory (DVD-ROM), or an universal serial bus (USB) memory, instead of such a manner as to be stored (installed) in advance in the storage medium 4, or may be downloaded from an external apparatus through a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to
        cause virtual objects respectively corresponding to real things in a real world and resembling the real things to be displayed in a virtual space, such that at least a first virtual object and a second virtual object are displayed so as to appear at different distances from a person viewing the virtual space based on a first degree of matching between a condition required by the person and an attribute of the real thing corresponding to the first virtual object being higher than a second degree of matching between the condition and the attribute of the real thing corresponding to the second virtual object.

2. The information processing apparatus according to claim 1,
    wherein when the second virtual object and a third virtual object have an identical degree of matching, the processor causes the second and third virtual objects to be each displayed so as to appear in a location an identical distance from the person.

3. The information processing apparatus according to claim 2,
    wherein the processor
        causes the first virtual object be displayed in a separate frame in the virtual space if the degree of matching between the condition and the attribute of the real thing corresponding to the first virtual object is lower than a predetermined degree.

4. The information processing apparatus according to claim 2,
  wherein the processor
    receives selection of the first virtual object, the selection being performed by the person, and
    causes a route object to be displayed in the virtual space, the route object corresponding to a route from the person to the real thing that corresponds to the first virtual object.

5. The information processing apparatus according to claim 2,
  wherein the processor
    receives priority in the condition, and
    causes the first virtual object to be displayed so as to appear at a location closer to the person than in the location of the second virtual object based on a degree of matching with the received priority in the condition.

6. The information processing apparatus according to claim 2,
  wherein each real thing is an image processing apparatus, and
  wherein the attribute includes at least one of a print speed, a number of reserved printing processes, and a color printing capability.

7. The information processing apparatus according to claim 2,
  wherein each real thing is a commodity,
  wherein the person is a person who intends to purchase the commodity, and
  wherein the attribute includes at least one of performance of the commodity, a price of the commodity, and time for delivering the commodity.

8. The information processing apparatus according to claim 1,
  wherein the processor
    causes the first virtual object to be displayed in a separate frame in the virtual space if the degree of matching between the condition and the attribute of the real thing corresponding to the first virtual object is lower than a predetermined degree.

9. The information processing apparatus according to claim 8,
  wherein the processor
    receives selection of the first virtual object, the selection being performed by the person, and
    causes a route object to be displayed in the virtual space, the route object corresponding to a route from the person to the real thing that corresponds to the first virtual object.

10. The information processing apparatus according to claim 8,
  wherein the processor
    receives priority in the condition, and
    causes the first virtual object to be displayed so as to appear at a location closer to the person than in a location of the second virtual object based on a degree of matching with the received priority in the condition.

11. The information processing apparatus according to claim 8,
  wherein each real thing is an image processing apparatus, and
  wherein the attribute includes at least one of a print speed, a number of reserved printing processes, and a color printing capability.

12. The information processing apparatus according to claim 8,
  wherein each real thing is a commodity,
  wherein the person is a person who intends to purchase the commodity, and
  wherein the attribute includes at least one of performance of the commodity, a price of the commodity, and time for delivering the commodity.

13. The information processing apparatus according to claim 1,
  wherein the processor
    receives selection of the first virtual object, the selection being performed by the person, and
    causes a route object to be displayed in the virtual space, the route object corresponding to a route from the person to the real thing that corresponds to the first virtual object.

14. The information processing apparatus according to claim 13,
  wherein the processor
    receives priority in the condition, and
    causes the first virtual object to be displayed so as to appear at a location closer to the person than in a location of the second virtual object based on a degree of matching with the received priority in the condition.

15. The information processing apparatus according to claim 13,
  wherein each real thing is an image processing apparatus, and
  wherein the attribute includes at least one of a print speed, a number of reserved printing processes, and a color printing capability.

16. The information processing apparatus according to claim 1,
  wherein the processor
    receives priority in the condition, and
    causes the first virtual object to be displayed so as to appear at a location closer to the person than in a location of the second virtual object based on a degree of matching with the received priority in the condition.

17. The information processing apparatus according to claim 1,
  wherein each real thing is an image processing apparatus, and
  wherein the attribute includes at least one of a print speed, a number of reserved printing processes, and a color printing capability.

18. The information processing apparatus according to claim 1,
  wherein each real thing is a commodity,
  wherein the person is a person who intends to purchase the commodity, and
  wherein the attribute includes at least one of performance of the commodity, a price of the commodity, and time for delivering the commodity.

19. The information processing apparatus according to claim 18,
  wherein the processor
    causes a route object to be displayed in the virtual space, the route object corresponding to a route representing an order of the real objects in order of the degree of matching between the condition and the attribute of each of the real objects.

20. A non-transitory computer readable medium storing a program causing a computer to execute a process for routine processing, the process comprising:

causing virtual objects respectively corresponding to real things in a real world and resembling the real things to be displayed in a virtual space, such that at least a first virtual object and a second virtual object are displayed so as to appear at different distances from a person viewing the virtual space based on a first degree of matching between a condition required by the person and an attribute of the real thing corresponding to the first virtual object being higher than a second degree of matching between the condition and the attribute of the real thing corresponding to the second virtual object.

\* \* \* \* \*